US008146138B2

(12) United States Patent
Chen et al.

(10) Patent No.: US 8,146,138 B2
(45) Date of Patent: Mar. 27, 2012

(54) ACCESS UNIT SWITCHING THROUGH PHYSICAL MEDIATION

(75) Inventors: Yuqun Chen, Bellevue, WA (US); Marcus Peinado, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 11/275,146

(22) Filed: Dec. 15, 2005

(65) Prior Publication Data

US 2007/0143839 A1 Jun. 21, 2007

(51) Int. Cl.
*G06F 21/00* (2006.01)
(52) U.S. Cl. .............. 726/4; 726/5; 713/166; 380/255; 709/229
(58) Field of Classification Search ....... 726/4; 713/200
See application file for complete search history.

(56) References Cited

U.S. PATENT DOCUMENTS

| | | | | |
|---|---|---|---|---|
| 5,720,033 | A * | 2/1998 | Deo | 726/2 |
| 6,023,765 | A * | 2/2000 | Kuhn | 726/4 |
| 6,163,272 | A * | 12/2000 | Goode et al. | 725/30 |
| 6,453,353 | B1 * | 9/2002 | Win et al. | 709/229 |
| 6,601,175 | B1 * | 7/2003 | Arnold et al. | 726/7 |
| 6,993,589 | B1 * | 1/2006 | Blumenau et al. | 709/229 |
| 7,103,914 | B2 * | 9/2006 | Focke et al. | 726/22 |
| 7,240,360 | B1 * | 7/2007 | Phan | 726/2 |
| 7,356,677 | B1 * | 4/2008 | Rafizadeh | 713/1 |
| 7,467,370 | B2 * | 12/2008 | Proudler et al. | 717/100 |
| 7,644,439 | B2 * | 1/2010 | Trostle | 726/23 |
| 2002/0093529 | A1 * | 7/2002 | Daoud et al. | 345/745 |
| 2003/0014667 | A1 * | 1/2003 | Kolichtchak | 713/201 |
| 2003/0097572 | A1 * | 5/2003 | Doo et al. | 713/182 |
| 2003/0117261 | A1 * | 6/2003 | Gunsch | 340/5.25 |
| 2003/0163513 | A1 * | 8/2003 | Schaeck et al. | 709/201 |
| 2003/0182586 | A1 * | 9/2003 | Numano | 713/202 |
| 2004/0205554 | A1 * | 10/2004 | Goswami et al. | 715/513 |
| 2004/0268155 | A1 * | 12/2004 | Andrews | 713/202 |
| 2005/0060581 | A1 * | 3/2005 | Chebolu et al. | 713/201 |
| 2005/0166064 | A1 * | 7/2005 | Dive-Reclus et al. | 713/189 |
| 2005/0204146 | A1 * | 9/2005 | Kebinger et al. | 713/182 |
| 2005/0210270 | A1 * | 9/2005 | Rohatgi et al. | 713/186 |
| 2005/0246762 | A1 * | 11/2005 | Girouard et al. | 726/2 |
| 2006/0212945 | A1 * | 9/2006 | Donlin et al. | 726/29 |
| 2006/0236127 | A1 * | 10/2006 | Kurien et al. | 713/193 |
| 2007/0079136 | A1 * | 4/2007 | Vishik et al. | 713/186 |

OTHER PUBLICATIONS

Sandhu et al., Role-Based Access Control Models, Feb. 1996, IEEE Computer, vol. 29, No. 2, pp. 38-47.*

* cited by examiner

*Primary Examiner* — Taghi Arani
*Assistant Examiner* — Morshed Mehedi
(74) *Attorney, Agent, or Firm* — Lee & Hayes, PLLC

(57) ABSTRACT

A plurality of access units may be established with varying levels of privilege and access rights, such that the user may perform tasks carrying with them a high risk of viral infection in an access unit with a low level of privilege and access rights. When an authenticated user desires to perform tasks requiring a higher level of privilege and access rights, the user may switch to an access unit having a higher privilege and access rights level by instigating a physical action. The physical action may include selecting a button (included in either a UI or on a peripheral device), or inputting biometric data to switch among running access units. A signal instigated by the physical action is transmitted along a trusted path between the isolation kernel and where the physical action was instigated.

9 Claims, 7 Drawing Sheets

ACCESS UNIT SWITCHING THROUGH PHYSICAL MEDIATION

BACKGROUND

The Principle of Least Privilege (POLP) is an effective measure against many computer viruses and spywares. POLP states that a running program should be given the bare minimum level of access rights sufficient for it to complete its job, In particular, administrator's privilege (or all access rights) should be withheld from programs such as email applications and Internet browsers, since a virus activated with administrator's privilege in these applications is in a position to cause serious damage to an infected host through actions such as installing and deleting applications and files. In contrast, a virus activated with only limited privilege and access rights has far less access to the resources of the infected host, and thus represents a lesser danger to the infected host.

In one attempt to overcome this problem, operating systems may allow users to simultaneously employ several active accounts, such as a low privilege user's account, and a high privilege administrator's account. For example, when a user wishes to perform tasks carrying a high risk of virus infection—such as downloading software or accessing email—the user may carry out these actions using an account having a restricted, or low level of privilege. Thus, if an infection occurs, the virus will be activated with a minimum level of privilege and the ill effects of the virus may be successfully contained.

In contrast, when a user wishes to perform other tasks that carry with them a low level of virus infection risk, and that require a higher level of privilege—such as system maintenance, creation of new user accounts, or the installation of new software—the user may log out of the low-privilege account and log into a high-privilege account.

When used correctly, this scheme of multiple accounts having varying levels of privilege is effective in containing the ill-effects of virus infestation resulting from high risk activities such as internet browsing, email viewing and the downloading of software from various network sources. However, room for improvement still exists.

For example, in practice many users find the requirement of logging in and out of various accounts to be cumbersome, and defer instead to an easier but more dangerous approach of using a single account with administrator's privilege for all of their daily tasks. As a result, such a user may effectively defeat the purpose of having multiple accounts, leaving the user's computer ripe for viral attack.

SUMMARY

A plurality of access units may be established with varying levels of privilege and access rights, such that the user may perform tasks carrying with is them a high risk of viral infection in an access unit with a low level of privilege and access rights. When an authenticated user desires to perform tasks requiring a higher level of privilege and access rights, the user may switch to an access unit having a higher privilege and access rights level by instigating a physical action. The physical action may include selecting a button (included in either a UI or on a peripheral device), or inputting biometric data to switch among running access units. A signal instigated by the physical action is transmitted along a trusted path between the isolation kernel and where the physical action was instigated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

The following disclosure describes one or more tools enabling a user to choose among access units having varying levels of privilege and access rights. In one embodiment, the tools allow the user to choose among a selection of access units through the use of a physical action committed by the user (and without requiring the user to manually logout of one access unit and manually login to another access unit). The tools may accept the user's choice of access unit through a user interface. Alternately, the user may enter the choice of access unit through a peripheral device.

Exemplary Operating Environment

Before describing the tools in detail, the following discussion of an exemplary operating environment is provided to assist the reader in understanding where and how the tools may be employed. The description provided below is exemplary and is not intended to limit application of the tools to a particular operating environment.

Figure 1:
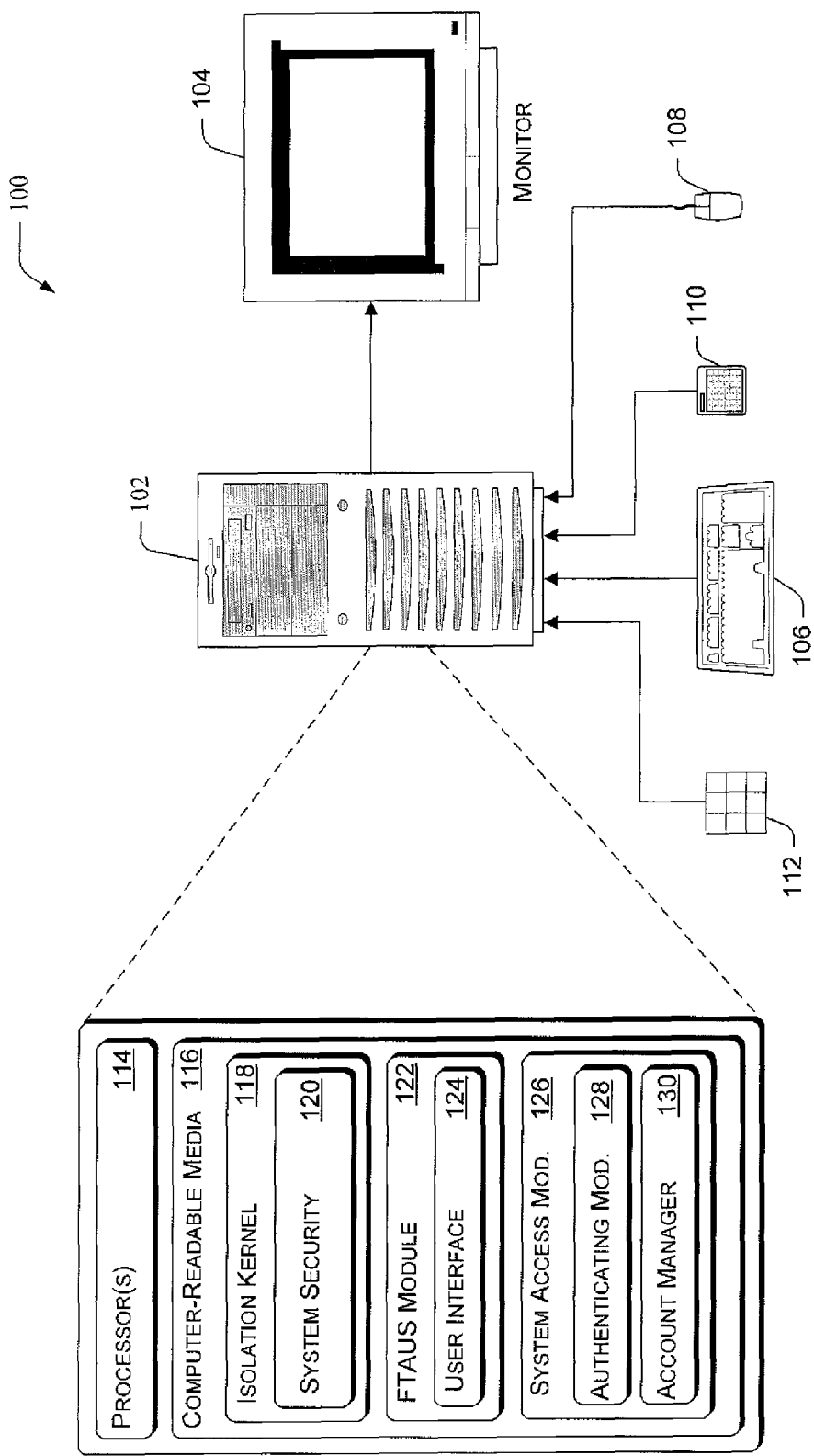
FIG. 1 illustrates an exemplary operating environment in which various embodiments can operate.

FIG. 1 illustrates one such operating environment generally at 100 comprising a computer 102, such as a personal computer (PC), having conventional user interface components such as a graphics display or monitor 104, a keyboard 106, a mouse or other pointing device 108, a biometric input device 110 and a keypad 112.

In the example described herein, computer 102 is a desktop computer. However, it could alternately comprise a variety of other types of computer and computer-like devices, such as a notebook or portable computer, a tablet PC, a cell phone, a personal digital assistant (PDA), a workstation, a mainframe computer, a server, an Internet appliance, a set-top box, combinations thereof, and so on.

Generally, a computer such as the one shown in FIG. 1 will have various functionality, allowing a user to perform many different tasks. For example, a user will typically be able to run a host of standard computer programs (word processing, spreadsheets, etc.) and games, send and receive emails, browse the Internet, etc. A user typically interacts with a computer such as this by moving an on-screen cursor with the mouse 108, and by typing at the keyboard 106. However, the user may also input commands or data to the computer 102 through use of the biometric input device 110, which may comprise a fingerprint reader, a handwriting reader, a microphone for the entry of voice commands, or any other biometric input device known in the art. Moreover, commands and data may also be entered to the computer 102 through the keypad 112 (which will be discussed in more detail below), a scanner, a camera, or any other device known in the art.

Computer 102 may also include one or more processor(s) 114 and computer-readable media 116, with the processor(s) 114 being capable of accessing and/or executing the computer-readable media 116. The computer-readable media 116 may comprise an isolation kernel 118 having a system security 120, a Fast Trusted Access Unit Switch (FTAUS) module 122 (which may or may not have a user interface 124), a system access module 126, an authenticating module 128, and an account manager 130. FIG. 1 shows the FTAUS module 122, the authenticating module 128, the account manager 130, and the system access module 126 as being separate from the isolation kernel 118. It will be understood, however, that any or all of the FTAUS module 122, the authenticating module 128, the account manager 130, and the system access module 126 may also be part of the isolation kernel 118. Similarly, the user interface 124 may be separate from the FTAUS module 122, the system security 120 may be separate from the isolation kernel 118, and the account manager 130 and authenticating module 128 may be separate from the system access module 126.

The system access module 126 may enforce a given access control policy. For example, to gain access to computer 102, a user may be required to be authenticated by the authenticating module 128 of system access module 126. To this end, the authenticating module 128 may screen potential users and the account manager 130 may classify the users according to the access control policy and its statements regarding the rights of each user to gain access to, and use, computer 102. This may include a determination by the account manager 130 regarding the rights of each user to use various resources of computer 102, including files, disks, portions of memory, peripherals, network access, credit card numbers, CPU time, etc. The system access module 126 may also be involved, in whole or in part, in policy enforcement on computer 102.

In one implementation, the system access module 126 may be implemented as computer-readable instructions. In such an implementation, the access control policy may be stored in computer-readable media 116 on computer 102, and the access control policy may state the privilege and access rights for each user having an account on, or able to have an account on, computer 102. The authenticating module 128 may authenticate users by means of usernames and/or passwords. Additionally, the authenticating module 128 may authenticate users by analyzing biometric data from the users, including fingerprints, retina structures, voice structures, handwriting, etc.

Once authenticated, the system access module 126 may create one or more accounts with appropriate levels of privilege and access rights for a user. In one implementation, this may be done in whole, or in part, by the account manager 130. The system access module 126 may also enforce policy, or policy may be enforced by a security system—such as system security 120—of an operating system kernel. The security system may consult the access control policy before any access request is allowed to proceed.

In another implementation, the system access module 126 may be implemented by a human system administrator. For example, a university department or school might rely on an employee to screen users wishing to gain access to computer 102. Such a human system access module 126 may authenticate users by manually viewing identification documents of users, such as student cards or driver's licenses, or by recognizing the faces of people with whom the system administrator is acquainted. Such authentication could then be used to enforce an access control policy. For example, the access control policy may be set by a department chairman, and state that professors from the department should be accorded unrestricted access to computer 102, while students should be afforded only limited access to computer 102. Further, the access control policy could state that persons who are neither professors nor students should be denied access to computer 102.

Once the user has been authenticated by the human system access module 126, one or more accounts with levels of privilege and access rights in accordance with the access control policy may be set up for the user by the system access module 126. The system access module 126 may also participate in enforcing the access control policy by refusing to create accounts for users who are neither professors nor students, and by refusing to create unrestricted accounts for students.

Figure 2A:
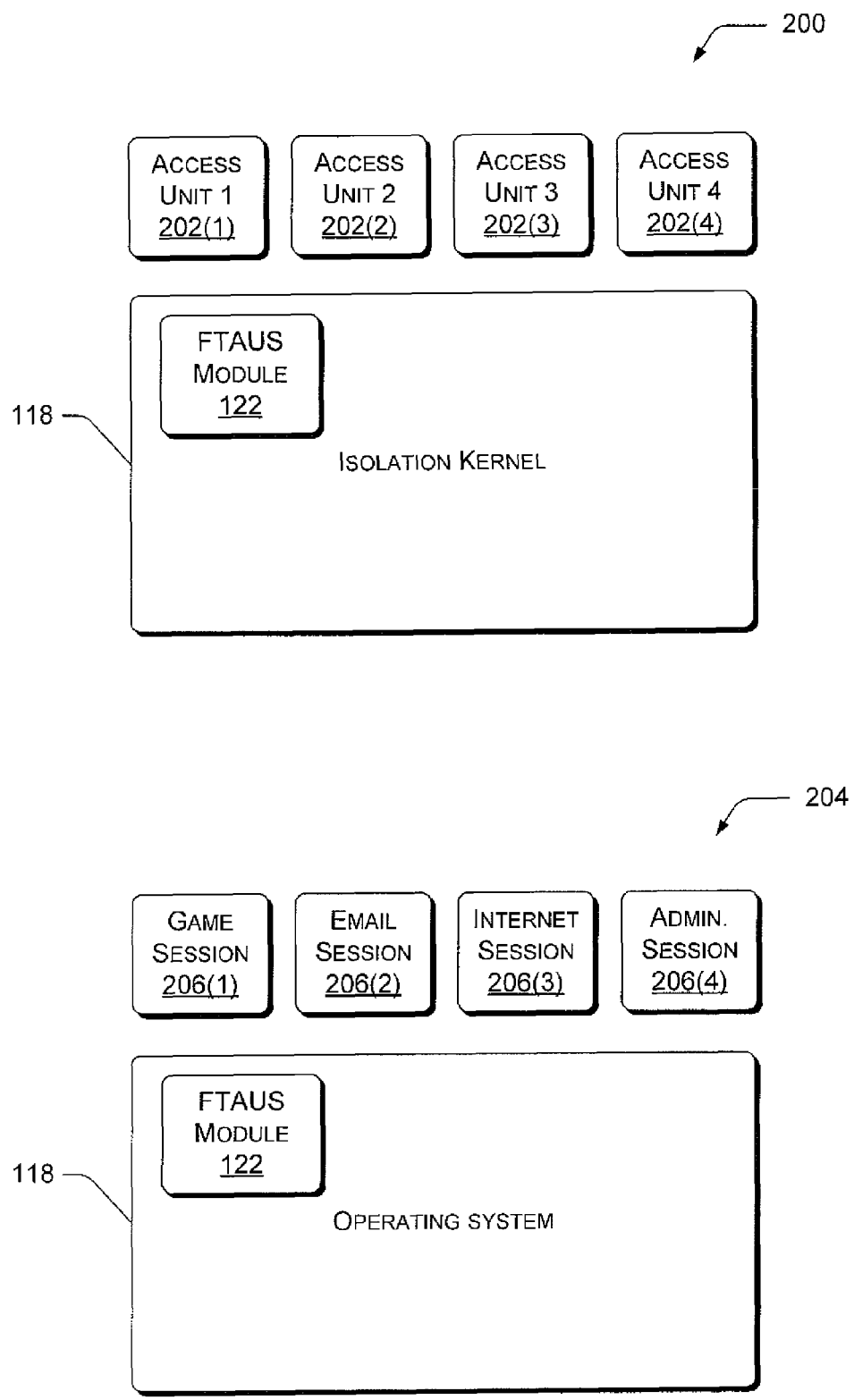
FIGS. 2a and 2b are block diagrams of exemplary isolation kernels, with each isolation kernel employing an FTAUS module to switch among several access units.

FIG. 2a, shows an implementation 200 in which computer 102 may be configured to simultaneously run several access units 202, including accounts and sessions having associated with them various levels of privilege and access rights. It will be understood that the term session, as used herein, includes the notion of a collection of interactive programs. Alternately, it will be understood that an account may comprise a security system in which humans or programs may be computer identifiers (such as account names, processes, virtual machines or programs). An account may associate privilege and access rights of code running under the identifier, along with authentication information, with each identifier.

Furthermore, each identifier of an account may have additional associated information, including user interfaces or user sessions. This may include a screen layout comprising a background picture and several windows, and a keyboard layout. In addition, each identifier may include an arbitrary further state. For example, this may include environment variables, home directories, instructions to execute certain programs under certain conditions, an audit policy, expiration data, etc.

In another possible implementation 204, computer 102 may be configured to run a multi-user operating system, such as the UNIX® operating system, the Windows® XP operating system marketed by the Microsoft® Corporation, a micro-kernel operating system, or a cell phone operating system such as those marketed by Symbian Ltd. The isolation kernel 118—or trusted computing base—may be an instance of the operating system, allowing several sessions, such as sessions 206(1)-(4), to run simultaneously on computer 102. The FTAUS Module 122 may reside within the isolation kernel 118 and be used to allow a user to switch between the sessions 206 with a physical action.

Figure 2B:
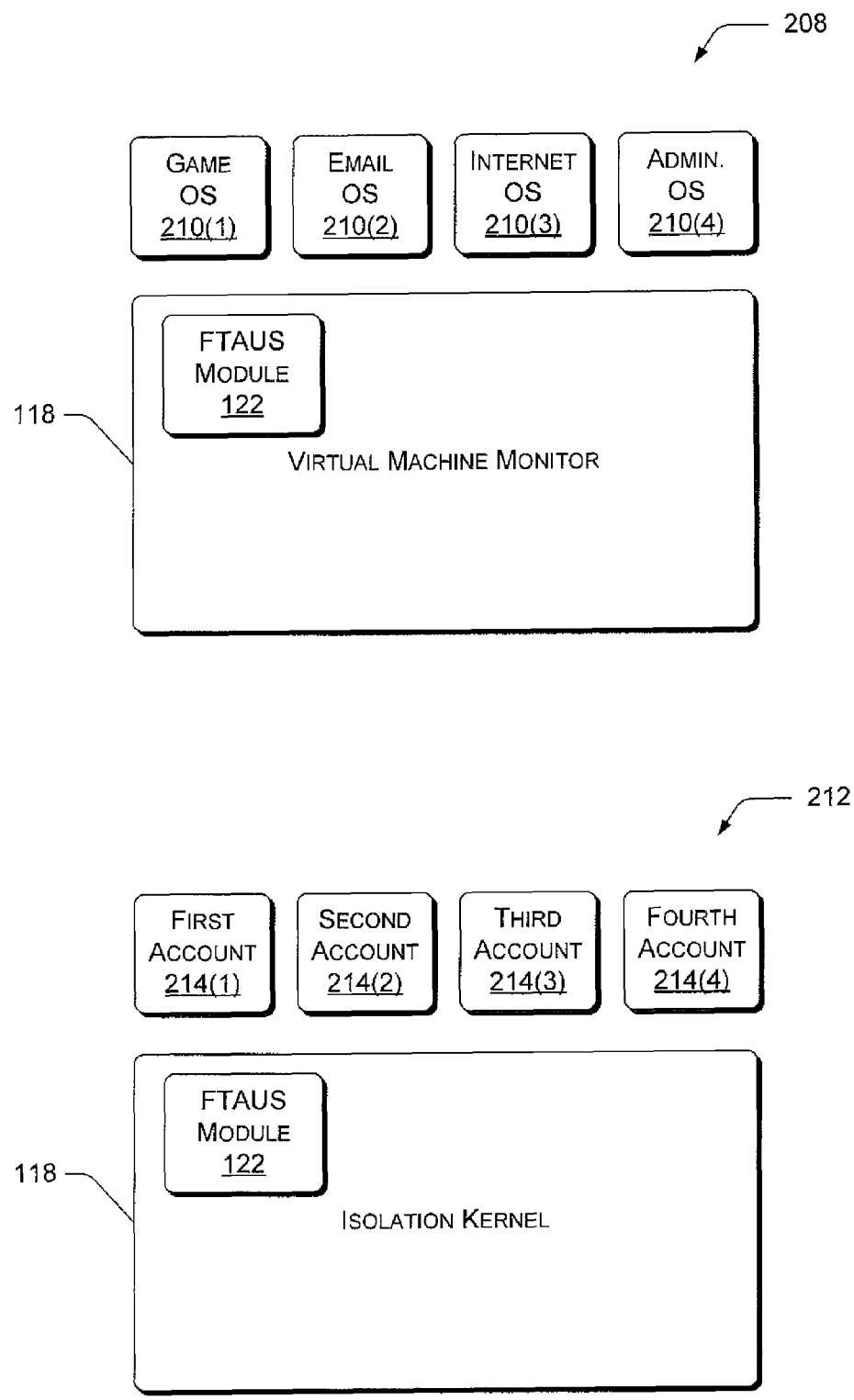

FIG. 2b illustrates another possible implementation 208, in which isolation kernel 118 may be configured to allow several access units 210, comprising instances of an operating system, to run simultaneously on computer 102. In such an instance, the isolation kernel 118 may comprise, for example, a Virtual Machine Monitor (VMM, Java Virtual Machine, NET CLR, etc.), with the FTAUS module 122 residing within the isolation kernel 118 and enabling the user to switch between the access units 210 with a physical action.

In yet another possible implementation 212, the isolation kernel 118 may be configured to allow several accounts 214 to run simultaneously on computer 102. In such an instance, the isolation kernel 118 may comprise, for example, a Virtual Machine Monitor, or an operating system, with the FTAUS module 122 residing within the isolation kernel 118 and enabling the user to switch between the accounts 214 with a physical action.

Returning to FIG. 1, in one implementation, a user may be required to be authenticated by system access module 126 before being allowed to gain access to computer 102. By examining information input by the user, such as usernames, passwords or other authenticating credentials (including biometric information, such as fingerprints input through the biometric input device 110), authenticating module 128 is capable of authenticating the identity of the user—as well as the user's rights to access a given account on computer 102. It will be understood that once a user has gained access to computer 102 by being been authenticated by system access module 126, the user can be said to be logged on to computer 102.

Once the user's identity is verified, account manager 130 may then be used to examine the user's account on computer 102 in order to determine the level of access rights or privileges to which the logged on user is entitled. In one possible implementation, account manager 130 may view the groups to which the user is a member. For example, if the user is only a member of a standard user group, the user may only be afforded minimal privileges or access rights. In such case, system security 120 may be employed to determine what kinds of tasks are permitted given the privilege and access rights information included in the user's account and, if a task is not permitted, system security 120 may prohibit the task from being performed by the user.

With these restrictions in place, multiple access units 202, 206, 210, 214 may then be created by the user, the computer 102, the system administrator module 126, or one or more tools or components within computer 102, and presented to the user by the FTAUS module 122. In the instant low-privilege and access rights example, the user would be limited to using access units 202, 206, 210, 214 with low privilege and access rights. For instance, the user could use separate access units for playing games 206(1), 210(1), checking email 206(2), 210(2) and browsing the Internet 206(3), 210(3). As a result of the low privilege and access rights associated with the access units, however, some tasks—such as installing device drivers, creating user accounts, and other tasks normally performed by an administrator—might be prohibited. When such a situation is encountered, such as when a software application or the user himself requests a task not allowed under the current level of privilege and access rights, system security 120 or other tools in computer 102, including FTAUS module 122, may prohibit that task. An error message may then be issued to the user informing the user that the task cannot be completed given the privilege and access rights level of the access unit and/or the user.

In such a protected low-privilege and access rights environment, however, if a virus is encountered, it will generally not be able to inflict as much damage as it could if the access units 202, 206, 210, 214 had a higher level of privilege and access rights, such as administrator's privilege.

In another possible implementation, the user could be a member of a local administrator's group, or another group that entitles its members to perform administrator's duties and/or enjoy a higher level of privilege and access rights in their access units 202, 206, 210, 214.

Alternately, the user could be a member of a trusted user group and as a consequence be assigned a new privilege and access rights, e.g., Permission to Enter Administrator's Role (PEAR). In such case, the trusted user would not have local administrator's privilege assigned to him, but rather the user with PEAR privileges would have a trusted user account (TUA). It will be understood that a user with PEAR privileges, or who otherwise is cleared to have administrator's privilege, may be called a trusted user. Once it is established that a user is a trusted user, account manager 130 could allow for the creation and use of a plurality of access units 202, 206, 210, 214 having different privilege and access rights levels, ranging from low to administrator's privilege.

For example, a trusted user may use an access unit 206(3), 210(3) with low privilege and access rights to browse the Internet, an access unit 206(1), 210(1) with slightly higher privilege and access rights to play games, and an access unit 206(4), 210(4) with high privilege and access rights to conduct tasks required from an administrator. In this way, the trusted user may effectively shield the computer 102 from viral attack by containing the activities most prone to such attack (such as browsing the Internet, checking email, and playing games) in access units 202, 206, 210, 214 having low privilege and access rights. When more privilege and access rights are needed, such as when the user wishes to change system settings or load software onto computer 102, the user may switch to a high privilege access unit 206(4), 210(4). In this manner, the user may have access to a high privilege and access rights access unit 206(4), 210(6) when needed, but can isolate other activities carrying with them a risk of viral infection, within access units 202, 206, 210, 214 having a lower level of privilege and access rights.

FTAUS module 122 allows a user to seamlessly and securely switch between access units 202, 206, 210, 214 belonging to the user through the instigation of a physical act—such as the selection of a button—which may create a signal that may be transmitted to the isolation kernel 118 via a trusted path. For example, FTAUS module 122 may allow a trusted user at the touch of a button to switch between the user's normal user account and an administrator's account. The signal from the button may be passed along a secure route from the button to the isolation kernel 118.

For simplicity and security, FTAUS module 122 may define two switching actions: trust enter and trust leave. In the trust enter action, a user, such as a trusted user, may enter an access unit 202, 206, 210, 214 with administrator's privilege from his regular user access unit 202, 206, 210, 214; while in the trust leave action, the user leaves the access unit with administrator's privilege 202, 206, 210, 214 and returns to his regular user access unit 202, 206, 210, 214. Normally, if only two access units—a user access unit and an administrator access unit—are open, a trust-enter event is followed by a trust-leave event and vice versa. Furthermore, no access unit switching is allowed between a pair of trust-enter and trust-leave.

The pairing of trust-enter and trust-leave is predicated on the notion that a trusted user should enter and leave an administrator's access unit 202, 206, 210, 214 for quick maintenance tasks that will last a very short duration. This simplifies security management and book-keeping in the isolation kernel 118.

The trust-enter action is physically initiated by the user. For example, in one implementation, a predetermined key combination, such as Window-T (Trust Switch), could be employed. In another possible implementation, the user could enter biometric information, such as placing a finger on the biometric input device 110, such that the biometric device may read the user's fingerprint and compared it against a fingerprint on file in order to confirm the identity of the user. Once the user's identity is confirmed, and the user is identified to be a trusted user, or a user with a sufficient level of clearance to swap between access units, the appropriate trust action may be triggered.

The trust-leave and trust-enter actions are asymmetrical in that the trust-leave action operates in a higher-privileged environment. It is therefore safe to allow, for example, a software user interface (UI) control to trigger the trust-leave action. Moreover, in one possible implementation, in order to keep the UI consistent, the same physical trigger as used for the trust-enter action may be used for the trust leave action.

Figure 3:
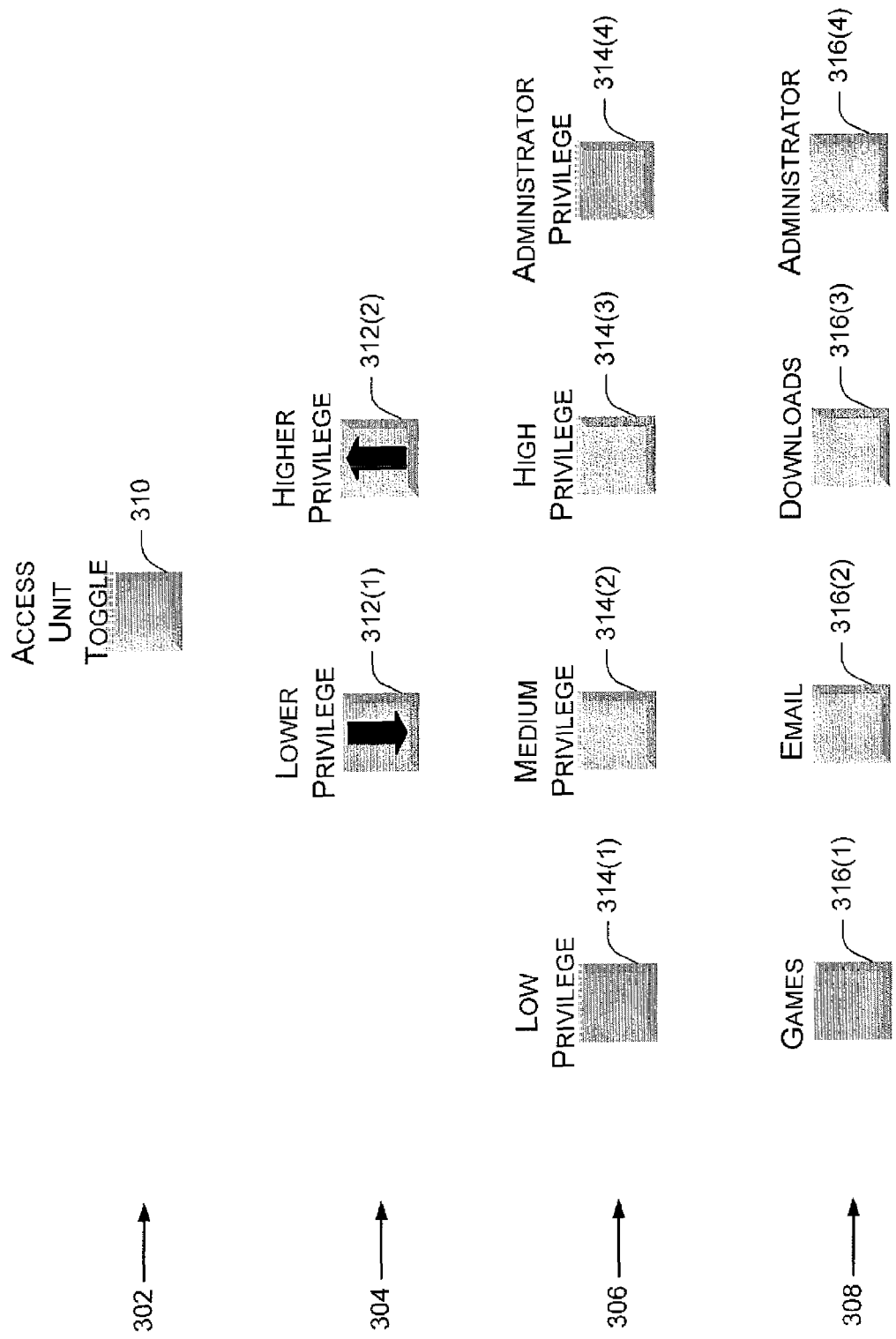
FIG. 3 illustrates an exemplary graphical user interface offering multiple access unit choices.

FIG. 3 illustrates several UIs 302, 304, 306, 308 which may be employed to effect trust-enter and trust-leave actions. For example, once a user has been authenticated by system access module 126, the user may press a single toggle button 310 to cycle through the assorted access units 202, 206, 210, 214 without having to be reauthenticated each time the user wishes to interact with a different access unit. Alternately, the user could be presented with two buttons 312(1), 312(2), with one button 312(1) allowing the user to switch to an access unit 202, 206, 210, 214 of lower privilege and access rights, and another button 312(2) allowing the user to switch to another access unit 202, 206, 210, 214 of higher privilege and access rights.

In yet another possible implementation 306, the user could be presented with a plurality of buttons 314 representing the privilege and access rights levels of the various open access units 202, 206, 210, 214. In this way the user can go directly to a privilege and access rights level suitable for the task which the user wishes to perform. In still another possible implementation 308, buttons 316 could be presented to the user labeled with tasks for which the individual access units are best suited. For example, a low privilege and access rights access unit may be associated with a button 316(1) titled "Games" indicating that the access unit is well-suited for playing games. Alternately, an access unit with administrator's privilege may be associated with a button 316(4) titled "Administrator". In this way, a user wishing to perform a given task can quickly and simply select the appropriate button 316 (and therefore access unit) associated with that task.

The buttons presented to the user in each of the possible UIs 302, 304, 306, 308 may be determined automatically using tools on the computer 102, such as the FTAUS module 122. For example, after a user has successfully logged on, and his privilege and access rights clearance has been successfully determined, the type and number of access units 202, 206, 210, 214 which may be run automatically may by selected, and instigated by the computer 102. Alternately, a list of possible access units 202, 206, 210, 214, may be presented to the user, and the user may be allowed to choose all or some of the listed access units 202, 206, 210, 214 to be run. In still another possible implementation, the user may be able to individually log on to one or more select access units 202, 206, 210, 214.

Moreover, the user may be allowed to alter the possible access unit selections by changing their names, privilege and access rights level, background colors, and so on. In addition, the user may be given the option of creating a possible list of access units 202, 206, 210, 214 himself. This could entail allowing the user to specify the names of the access units 202, 206, 210, 214, as well as the privilege and access rights levels, and assorted other options including applications which may be run in the access units 202, 206, 210, 214, as well as the look and feel of the access units 202, 206, 210, 214 in the form of background and other factors.

The assorted UIs 302, 304, 306, 308 may be presented the entire time the user is logged on to the computer, or they may be brought into view by instigating a specific key sequence or selecting an icon.

It will also be understood that the various collections of buttons illustrated as UIs 302, 304, 306, 308 may also be implemented on peripheral devices connected to computer 102. For example, keypad 112 may have physical buttons in any of the configurations 302, 304, 306, 308 mentioned above, allowing the logged on user to manually effect a desired switching of 202, 206, 210, 214. It is also possible for other peripherals to be used, including a voice activated option whereby a user may speak into a microphone connected to computer 102 and use spoken words to select the various buttons mentioned above.

In the event that computer 102 is a cell phone, the UIs 302, 304, 306, 308 could be presented on a display of the cell phone, and activated by pressing given keys on a keypad of the cell phone. Alternately, up-down, and left-right arrows commonly included on most cell phones could be used to cycle through the various access units available to the cell phone user in order to select a desired access unit for a task to be completed. Moreover, the keys on the keypad themselves could be marked with various designations such as "games", "email", and "administrator" as discussed above. In such a scenario, the cell phone user would not need a UI presented on the monitor of the cell phone to be able to select a desired access unit 202, 206, 210, 214.

Overall, by requiring a physical action from a logged on user, FTAUS module 122 prevents software-based attacks, except attacks directed to the isolation kernel 118 itself. Also, since in conventional systems implementing the Principle of Least Privilege (POLP) a trusted user already logs on with full administrator's privilege, there are no additional security risks in letting him switch to the local administrator account using FTAUS module 122. Thus, FTAUS module 122 may improve the real-world security of computer 102 by making it easier for users to take full advantage of the benefits of using multiple access units 202, 206, 210, 214 with varying levels of privilege and access rights.

Moreover, since FTAUS module 122 defines a trusted switching between two access units 202, 206, 210, 214, the isolation kernel 118 can take a shortcut when switching between a trusted user's access unit and an administrator's access unit. The reduced overhead will further enhance the user experience and induce many users to follow the safe practice intended by FTAUS module 122.

Additionally, by using the FTAUS module 122, the requirement of users to reauthenticate themselves by typing in passwords and other confidential information each time they enter an access unit with administrator's privilege is lifted. This makes it more likely that users will not simply stay in an access unit 206(4), 210(4) with administrator's privilege as they conduct all of the tasks they wish to complete—including those carrying with them a high risk of viral infection. Moreover, by ameliorating the need for the input of passwords in order to enter an access unit 206(4), 210(4) with administrator's privilege, the threat of Trojan-horse style attacks by viruses attempting to spoof an authentication user interface and steal password information are vitiated.

Method for Automatic Creation of Access Units

Figure 4:
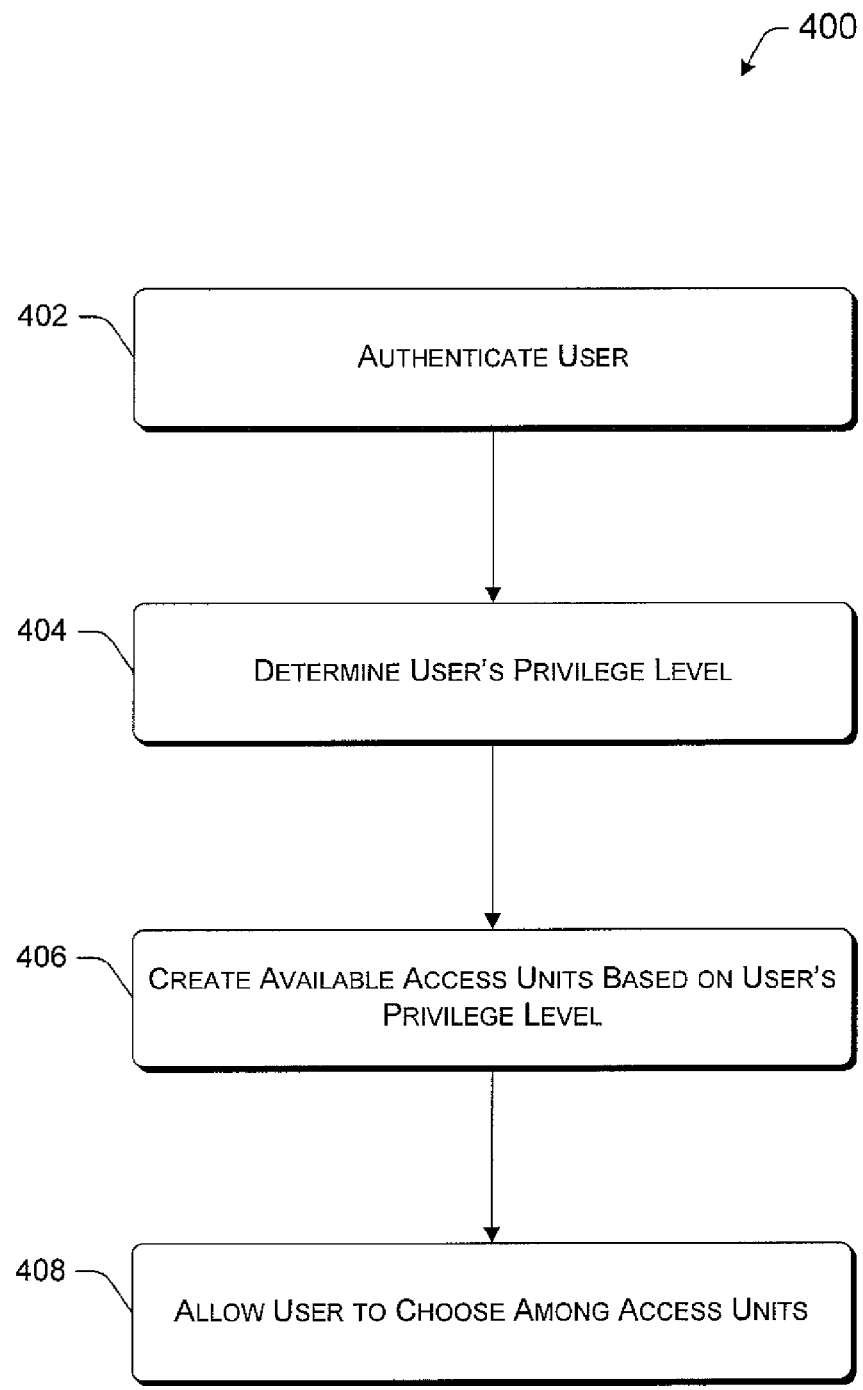
FIG. 4 is a flow diagram illustrating a method of a creating access units based on a user's privilege and access rights level, and allowing the user to switch between access units.

Another aspect of allowing a user to automatically create access units 202, 206, 210, 214 is shown in FIG. 4 which illustrates an exemplary method 400 performed by tools within computer 102. For ease of understanding, the method 400 is delineated as separate steps represented as independent blocks in FIG. 4; however, these separately delineated steps should not be construed as necessarily order dependent in their performance. Additionally, for discussion purposes, the method 400 is described with reference to elements in FIGS. 1-3. This flow diagram may be implemented in any suitable hardware, software, firmware, or combination thereof. In the case of software and firmware, this diagram represents sets of operations implemented as computer-executable instructions.

The method 400 begins by allowing the user to be authenticated (block 402). This may be done as the user attempts to access computer 102, or it may be done after access to computer 102 has been achieved. For example, the user may be working in a guest account with low-privilege and access rights and may desire to switch to a multi-access unit environment. In order for this to happen, the user may authenticate himself by entering personal data (block 402).

The authentication process may entail allowing the user to enter information such as a user name, password or code, or it may entail allowing the user to enter biometric information such as a fingerprint, a handwriting sample, a retinal scan, a voice command, etc.

Once the information entered by the user has been received, and the identity of the user has been confirmed, the account of the user, or the identity of the user, may be examined to determine the maximum allowable privilege and access rights level that can be accorded to the user (block 404). In one implementation, this information can be located by examining the various groups to which the user is a member, including checking to see if the user is a member of a trusted user group.

Once the maximum allowable privilege and access rights level that can be accorded to the user is determined, the various available access units 202, 206, 210, 214 which the user may run may be established (block 406). For example, if the maximum level of privilege and access rights that the user can be afforded is low, then only access units 202, 206, 210, 214 having low levels of privilege and access rights may be run by the user. Conversely, if the maximum allowable privilege and access rights which may be accorded to the user is high, such as, administrator's privilege, access units 202, 206, 210, 214 having low levels of privilege and access rights as well as access units 202, 206, 210, 214 having high levels of privilege and access rights may be created.

The various possible access units 202, 206, 210, 214 may be chosen by is computer 102, or various tools within computer 102—including FTAUS module 122. Alternately, the various possible access units 202, 206, 210, 214 as determined by computer 102, or various tools within computer 102—including FTAUS module 122, may be presented to the user, who may select a number of automatically created access units 202, 206, 210, 214 which may be run simultaneously. This list of possible access units may also be preprogrammed into computer 102 by the user, who may set the privilege and access rights level for each access unit to a level at or below the maximum which can be afforded to the user. Moreover, the user may also pre-program the configuration of each access units, including mandating which applications may be run in the access units, and setting the look and feel of each access units. It will also be understood, that the user may individually log on to a plurality of access units.

Method 400 may also allow the user to switch access units 202, 206, 210, 214, or choose from among access units 202, 206, 210, 214 using a physical action (block 408) in a secure environment once the user's identity has been authenticated. A signal generated by the physical action may then be connected to the isolation kernel 118 via a trusted, secure path. In one implementation, the user may be presented with a UI comprising the various available access units 202, 206, 210, 214, and the user may select the desired access unit 202, 206, 210, 214 by directing a pointer to a button 314, 316 corresponding to the desired access unit 202, 206, 210, 214 and selecting the button 314, 316 with the mouse 108. Alternately, the user may be presented with a single button 310 allowing the user to toggle through the available access units 202, 206, 210, 214. In yet another implementation, the user may be presented with a button 312(1) allowing the user to cycle to access units 202, 206, 210, 214 of decreasing privilege and access rights. The user may also be presented with a button 312(2) allowing the user to cycle to access units 202, 206, 210, 214 of increasing privilege and access rights.

In yet another implementation, the button(s) presenting the options discussed above may be available on a peripheral device connected to the computer, such as the keypad 112. Alternately, the physical action could comprise the entry of biometric information, such as fingerprint data via the biometric input device 110. In still another implementation, the user could switch between access units 202, 206, 210, 214 using speech commands and voice recognition instructions.

Method for Manually Creating and Choosing among Access Units

Figure 5:
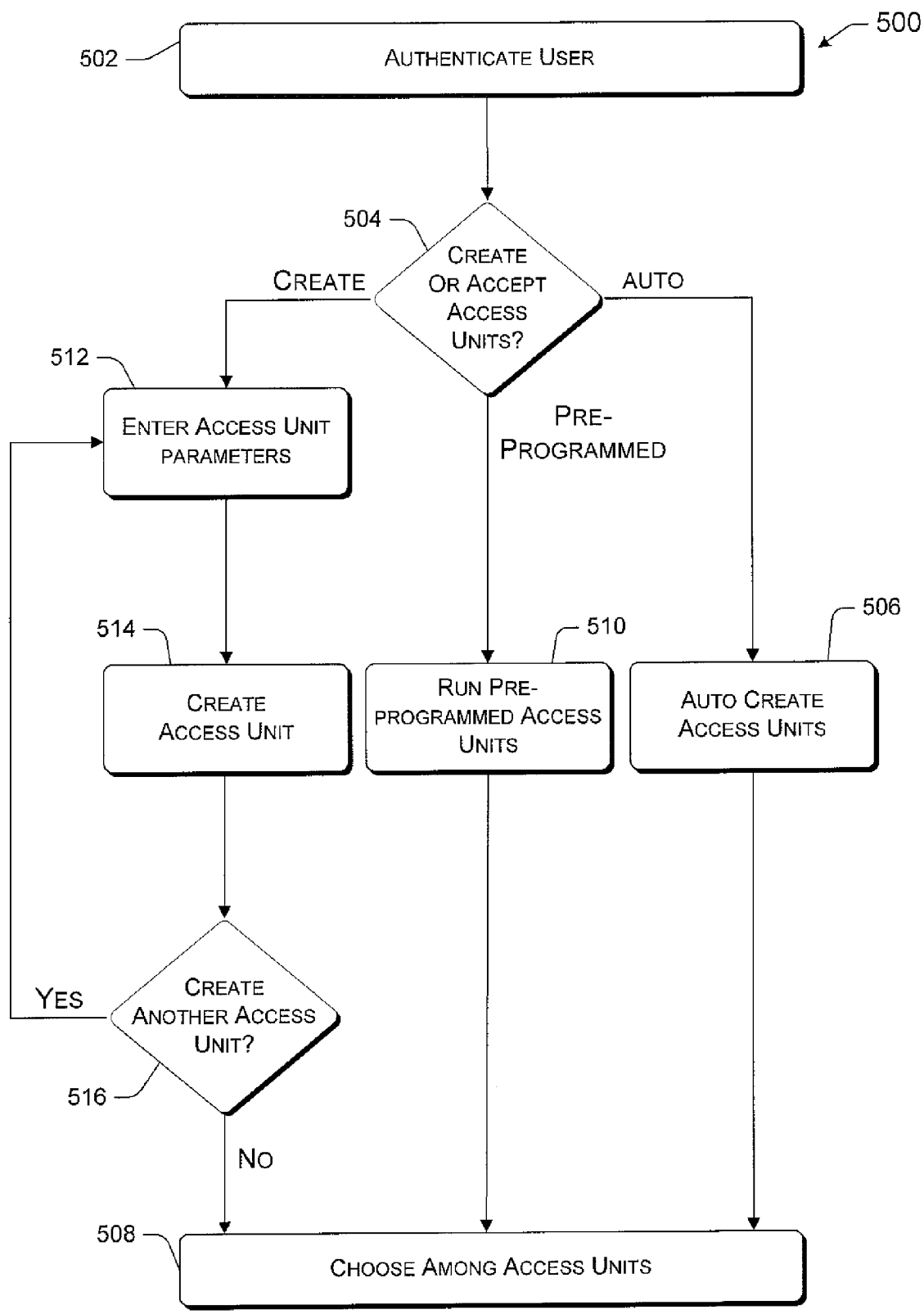
FIG. 5 is a flow diagram illustrating a method of manually or automatically creating access units based on a user's privilege and access rights level, and allowing the user to switch between access units.

Another aspect of allowing a user to create and switch between access units 202, 206, 210, 214 with a physical action is shown in FIG. 5 which illustrates an exemplary method 500 performed by tools within computer 102. For ease of understanding, the method 500 is delineated as separate steps represented as independent blocks in FIG. 5; however, these separately delineated steps should not be construed as necessarily order dependent in their performance. Additionally, for discussion purposes, the method 500 is described with reference to elements in FIGS. 1-3. This flow diagram may be implemented in any suitable hardware, software, firmware, or combination thereof. In the case of software and firmware, this diagram represents sets of operations implemented as computer-executable instructions.

The method 500 allows a user to authenticate his identity—either to gain access to computer 102, or after access has been gained in order to attempt to run several simultaneous access units (block 502). Authentication may entail allowing the user to enter information such as a user name, password or code, or authentication may entail allowing the user to enter biometric information such as a fingerprint, retinal information, a handwriting sample, a voice sample, etc. Once the information entered by the user has been received, and the identity of the user has been confirmed, the account or the identity of the user may be examined to determine the maximum allowable level privilege and access rights that can be accorded to the user. In one implementation this information can be located by examining the various groups to which the user is a member, including a trusted user group.

Once login of the user has been successfully completed, the method 500 may give the user the option to manually create access units 202, 206, 210, 214 or accept preprogrammed or automatically created access units (block 504). If the user decides to accept automatically created access units ("auto" path from block 504), computer 102, or one or more of the tools thereon, may automatically create access units 202, 206, 210, 214 (block 506) given the users privilege and access rights level, and the user will be allowed to begin switching among access units 202, 206, 210, 214 (block 508). In one possible implementation, the user may be presented with a list of possible access units 202, 206, 210, 214 created by the computer 102 or one or more of the tools thereon, and given the opportunity to choose one or more access units 202, 206, 210, 214 from the list to be run. In another possible implementation, the method 500 may omit giving the user a choice at block 504, and instead computer 102 or one or more of the tools thereon will automatically create the available access units given the user's maximum level of allowable privilege and access rights.

If at block 504 the user decides to accept preprogrammed access units 202, 206, 210, 214 ("pre-programmed" path from block 504) then method 500 may allow the user to accept access units 202, 206, 210, 214, pre-programmed into computer 102 by the user. The pre-programmed access units may have set privilege and access rights levels (at or below the privilege and access rights available to the user). The pre-programmed access units may also have set applications which may be run in the access units 202, 206, 210, 214, and a pre-programmed look and feel. The method 500 may then run the pre-programmed access units 202, 206, 210, 214 (block 510), and the user may be allowed to begin switching among the access units 202, 206, 210, 214 (block 508).

Alternately, if at block 504 the user decides to manually create the access units 202, 206, 210, 214 ("create" path from block 504) then method 500 may allow the user to enter parameters for an access unit 202, 206, 210, 214, such as privilege and access rights level (at or below that available to the user). Method 500 may allow the user to enter parameters for applications which may be run in the access unit 202, 206, 210, 214, as well as the look and feel of the access unit 202, 206, 210, 214 (block 512). Once entered, the parameters for the access unit 202, 206, 210, 214 may be used to create a new access unit 202, 206, 210, 214 (block 514).

The user may then be presented with the option of creating another access unit 202, 206, 210, 214 (block 516). If the creation of another access unit 202, 206, 210, 214 is desired, ("yes" path from block 516), method 500 proceeds to block 512. Alternately, if the creation of another access unit 202, 206, 210, 214 is not desired ("no" path from block 516), method 500 proceeds block 508 and allows the user to switch among access units 202, 206, 210, 214 using a physical action generating a signal which may be transmitted along a trusted path to the isolation kernel 118.

It will be understood that access units 202, 206, 210, 214 created using the loop of blocks 512-516 may comprise the pre-programmed access units that may later be used at block 510.

It will also be understood that once the user has been authorized, the user may be able to log on individually to various pre-created access units (such as user accounts) and switch among them (block 508) using a physical action generating a signal which may be transmitted along a trusted path to the isolation kernel 118.

Method for Switching among Access Units

Figure 6:
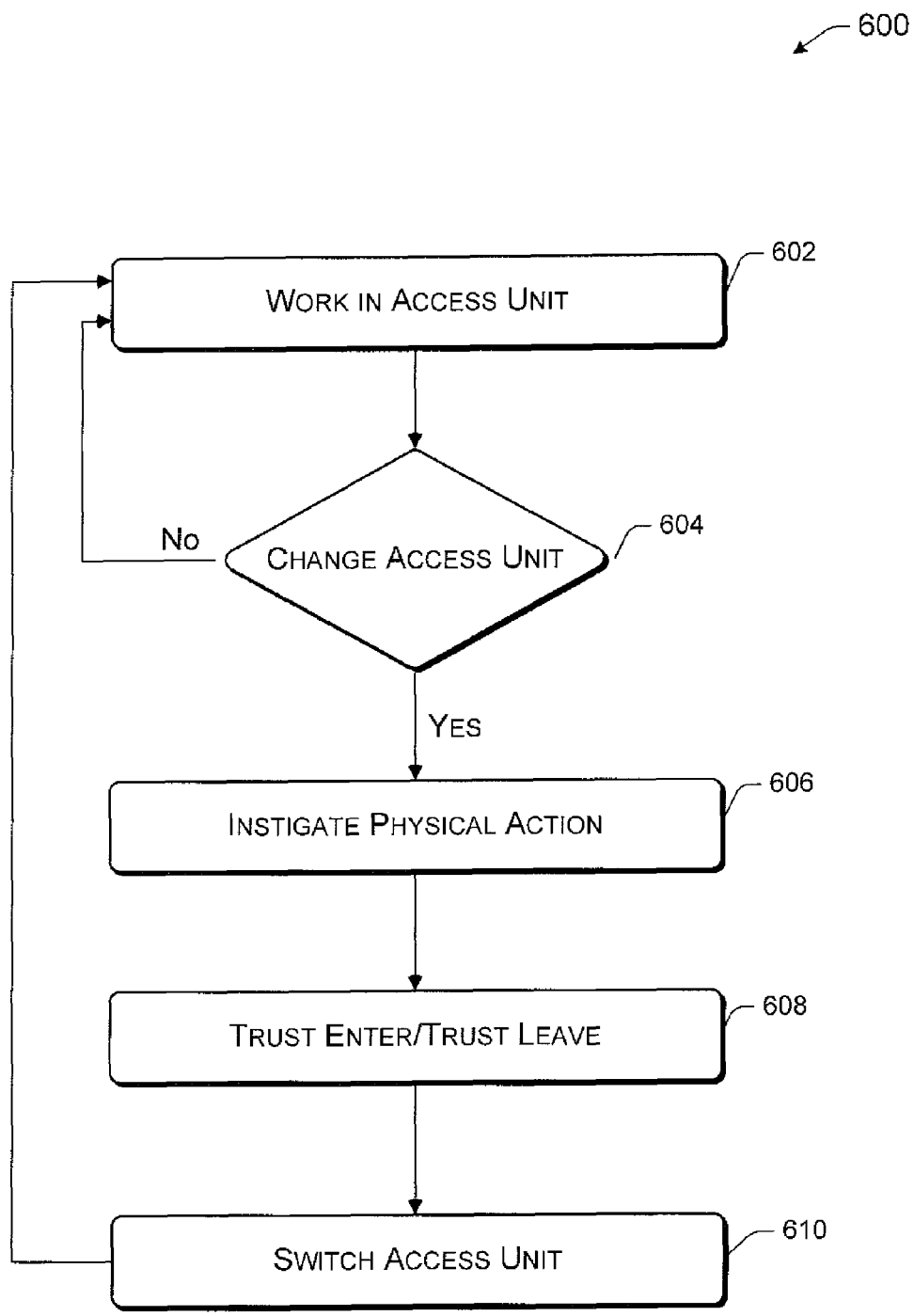
FIG. 6 is a flow diagram illustrating a method of switching between access units.

Another aspect of allowing a user to switch between access units 202, 206, 210, 214 with a physical action is shown in FIG. 6 which illustrates an exemplary method 600 performed by tools within computer 102. For ease of understanding, the method 600 is delineated as separate steps represented as independent blocks in FIG. 6; however, these separately delineated steps should not be construed as necessarily order dependent in their performance. Additionally, for discussion purposes, the method 600 is described with reference to elements in FIGS. 1-3. This flow diagram may be implemented in any suitable hardware, software, firmware, or combination thereof. In the case of software and firmware, this diagram represents sets of operations implemented as computer-executable instructions.

A user whose identity has been authenticated, and who is working in an access unit 202, 206, 210, 214 (block 602) may be given the option to change access units (block 604). In one implementation, a UI allowing the user to effect a change may be constantly displayed on the display 104. In another implementation, a UI allowing the user to effect an access unit change may be brought up by a selected sequence of keystrokes, or by selecting an icon on either the desktop or a toolbar. In yet another implementation, a peripheral device may exist with an offering of buttons or other selection devices allowing the user to effect an access unit change.

If the user does not desire an access unit change ("no" path from block 604) then the user need do nothing. Alternately, however, if the user desires an access unit change ("yes" path from block 604), the user may instigate a physical action (block 606) to effect an access unit switch. This physical action may comprise selecting an option presented on a UI, manually pressing a button or switch on a peripheral device, or entering biometric information, such as a fingerprint, a handwriting sample, a retinal scan, or a voice command, into a peripheral device connected to computer 102. A signal created once the physical action is instigated may then be transmitted along a secure connection to the isolation kernel 118. The user will only be allowed to transition to access units 202, 206, 210, 214 with privilege and access rights levels at or below that available to the user.

In one implementation, two switching actions: trust enter and trust leave may then be activated. For example, in the trust enter action, a user, such as a trusted user, may enter an access unit 202, 206, 210, 214 with administrator's privilege from his regular user access unit 202, 206, 210, 214 (block 610). Alternately, if a user is in an access unit with administrator's privilege, the physical action will activate the trust leave action thus logging the user off the access unit 206(4), 210(4) with administrator's privilege 202, 206 and returning the user to a regular user access unit 202, 206, 210, 214 (block 610). The pairing of trust-enter and trust-leave is predicated on the notion that a trusted user should enter and leave an administrator's access unit 202, 206 for quick maintenance tasks that will last a very short duration. This simplifies security management and book-keeping in the isolation kernel 118.

The trust-leave and trust-enter actions are asymmetrical in that the trust-leave action operates in a higher-privilege and access rights environment. It is therefore safe to allow a software user interface (UI) control to trigger the trust-leave action. Moreover, in one possible implementation, in order to keep the UI consistent, the same physical trigger as used for the trust-enter action may be used for the trust leave action.

It will be understood that the UIs and peripheral devices mentioned above may present the user with several possible access units 202, 206, 210, 214, depending on the user's privilege and access rights clearance. For example, if the user is a trusted user, he may have one available access unit 206(4), 210(6) with administrator's privilege, and several other access units 202, 206, 210, 214 with lower levels of privilege and access rights. Thus, the trust-enter, trust-leave mechanism may be used in conjunction with several running access units 202, 206, 210, 214 having various levels of priority.

Once the access unit 202, 206, 210, 214 is successfully switched, the user may work in the new access unit (block 602). While working, the user may be allowed to perform tasks which can be supported by the privilege and access rights level of the access unit 202, 206, 210, 214. If the user attempts to do something for which more privilege and access rights is required, an error message may be issued telling the user to switch to another available access unit 202, 206, 210, 214 with a higher privilege and access rights level. In one implementation, the error message may suggest to the user one or more available access units 202, 206, 210, 214 having levels of privilege and access rights sufficient for completion of the task which tripped the error message. In another implementation, the error message may present the user with a button or activation device which the user could select, and which would constitute an appropriate, secure physical action (block 606), and thus instigate the necessary trust-enter, trust-leave reaction (block 608) to switch the user to the appropriate access unit (block 610).

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed invention.

The invention claimed is:

1. A computer comprising:

a processor; and a fast trusted access unit switch module stored in a virtual machine monitor of the computer and executable on the processor configured to:

verify identity of a user of a single account on a computing device including a fast trusted access unit switching module that enables the user to securely switch between a plurality of levels of allowable privilege and access rights;

determine the plurality of levels of allowable privilege and access rights which afforded to the user of the single account, the plurality of levels of allowable privilege and access rights includes at least a high level and a low level;

establish a plurality of access units on the computing device with each of the access units capable of having a plurality of levels of privilege and access rights;

grant access to the user of the single account to interface with the access unit, via the fast trusted access unit switch module, with the low level of privilege and access rights required to interface with the access unit; and change the low level of privilege and access rights to the high level of privilege and access rights for the user of the single account when the user of the single account is required to interface with the access unit using the high level of privilege and access rights when the user initiates a first physical action that generates a signal that is provided to an isolation kernel via a trusted path; and change the high level of privilege and access right to the low level of privilege and access rights for the user of the single account when the user of the single account is not required to interface with the access unit using the high level of privilege and access rights when the user initiates a second physical action that generates a signal that is provided to the isolation kernel via the trusted path.

2. The computer of claim 1, wherein the fast trusted access unit switch module only allows the user to run access units having levels of privilege and access rights at or below the maximum level of privilege and access rights associated with the user.

3. One or more computer-readable devices having computer-readable instructions therein that, when executed by a computing device, cause the computing device to perform acts comprising:

verifying the identity of a user of a single account on a computing device including a fast trusted access unit switching module that enables the user to securely switch between a plurality of levels of allowable privilege and access rights;

determining the plurality of levels of allowable privilege and access rights which can be afforded to the user of the single account, the plurality of levels of allowable privilege and access rights includes at least a high level and a low level;

establishing a plurality of access units on the computing device with each of the access units capable of having a plurality of levels of privilege and access rights;

granting access to the user of the single account to interface with the access unit, via the fast trusted access unit switch module, with the low level of privilege and access rights required to interface with the access unit; and changing the low level of privilege and access rights to the high level of privilege and access rights for the user of the single account when the user of the single account is required to interface with the access unit using the high level of privilege and access rights when the user initiates a first physical action that generates a signal that is provided to an isolation kernel via a trusted path; and changing the high level of privilege and access right to the low level of privilege and access rights for the user of the single account when the user of the single account is not required to interface with the access unit using the high level of privilege and access rights when the user initiates a second physical action that generates a signal that is provided to the isolation kernel via the trusted path.

4. The one or more computer-readable devices as recited in claim 3, wherein establishing a plurality of access units comprises allowing the user to choose from among a plurality of at least partially preset access units having levels of privilege and access rights not exceeding the high level of allowable privilege and access rights which can be afforded to the user.

5. The one or more computer-readable devices as recited in claim 3, wherein establishing a plurality of access units comprises allowing the user to create a plurality of access units having levels of privilege and access rights not exceeding the high level of allowable privilege and access rights which can be afforded to the user.

6. The one or more computer-readable devices as recited in claim 3, wherein each access unit comprises an instance of an operating system.

7. The one or more computer-readable devices as recited in claim 3, wherein each access unit comprises a collection of interactive programs that are being used by the user.

8. The one or more computer-readable devices as recited in claim 3, further comprising instructions therein that, when executed by a computing device, cause the computing device to display an access unit selection user interface allowing the user to see and select between all open access units.

9. The one or more computer-readable devices as recited in claim 3, wherein allowing the user to switch between access units comprises receiving data from a peripheral device.

* * * * *